United States Patent [19]

Hughes et al.

[11] Patent Number: 4,726,830
[45] Date of Patent: Feb. 23, 1988

[54] GLASS BATCH TRANSFER ARRANGEMENTS BETWEEN PREHEATING STAGE AND LIQUEFYING STAGE

[75] Inventors: Gary N. Hughes, Ross Township; Donald P. Michelotti, Hampton Township, both of Pa.

[73] Assignee: PPG Industries, Inc., Pittsburgh, Pa.

[21] Appl. No.: 914,437

[22] Filed: Oct. 2, 1986

[51] Int. Cl.⁴ ............................................... C03B 3/00
[52] U.S. Cl. .......................................... 65/27; 65/134; 65/335; 65/347
[58] Field of Search ................... 65/135, 136, 27, 335, 65/347, 134

[56] References Cited

U.S. PATENT DOCUMENTS

| | | | |
|---|---|---|---|
| 3,030,094 | 4/1962 | Saeman | 263/52 |
| 3,508,742 | 4/1970 | Minegishi | 263/32 |
| 4,113,459 | 9/1978 | Mattmuller | 65/135 |
| 4,185,984 | 1/1980 | Kiyonaga | 65/135 |
| 4,349,366 | 9/1982 | Saeman | 65/27 |
| 4,496,387 | 1/1985 | Heithoff et al. | 65/335 |
| 4,519,814 | 5/1985 | Demarest, Jr. | 65/27 |
| 4,529,428 | 7/1985 | Groetzinger | 65/27 |

*Primary Examiner*—Arthur Kellogg
*Attorney, Agent, or Firm*—Dennis G. Millman

[57] ABSTRACT

In an arrangement for preheating and liquefying glass batch materials or the like, the material is transferred from the preheater to the liquefying vessel by conveyor means that isolates batch material from exhaust gas and permits feeding of the batch material to selected regions of the liquefying vessel.

13 Claims, 6 Drawing Figures

GLASS BATCH TRANSFER ARRANGEMENTS BETWEEN PREHEATING STAGE AND LIQUEFYING STAGE

BACKGROUND OF THE INVENTION

In U.S. Pat. No. 4,519,814 (Demarest) there is disclosed a two-stage glass batch liquefaction process wherein glass batch is preheated by contact with exhaust gas from a liquefying stage to which the preheated glass batch is fed. At the junction of the preheating device and the liquefying vessel the countercurrent flow of exhaust gas and batch material has been found to create some difficulties, some of which are addressed in U.S. Pat. No. 4,496,387 (Heithoff et al.) These difficulties include entrainment of batch material in the exhaust gas stream and premature fusing of the batch material in the preheating device. The last mentioned patent provides substantial relief from these difficulties by vertically segregating the batch stream from the exhaust stream, whereby the batch materials are discharged from the lower side of the preheating vessel, and the exhaust gases are directed by means of a duct to an upper portion of the preheating vessel. Although such an arrangement is advantageous, additional separation between the batch stream and the exhaust would be desirable in order to better avoid entrainment of the batch materials in the exhaust stream and to provide greater freedom in locating the feed point and the exhaust duct on the liquefying vessel.

Constraints on the interconnection of the preheater and the liquefier include the desirability of maintaining the exhaust gas duct as short as possible so as to minimize heat loss, the requirement that a sufficient angle be provided on the batch chute to assure that the batch flows freely by gravity, and the desire to avoid extending a portion of the preheater directly above the liquefier so as to preserve accessibility to the lid region of the liquefier for maintenance. It would be desirable to provide additional space between the exhaust duct and the location at which the batch material is deposited into the liquefying vessel but to do so while maintaining the required angle for batch flow would seemingly require either that portions the preheater would extend above the liquefier or that the preheater and liquefier would have to be spaced farther apart, both vertically and horizontally. Both of these options have drawbacks and therefore are unattractive. In addition to avoiding unnecessary heat loss, minimizing the length of the exhaust duct is also preferred for the sake of avoiding undue enlargement of the relatively cool duct surface upon which entrained and/or vaporized materials can be deposited and accumulate.

U.S. Pat. No. 3,030,094 (Saeman) shows a sloped batch chute and a separate flue connecting a preheating a vessel and a melting vessel. To provide sufficient vertical separation for the batch material to flow by gravity down the chute, the reference relies on rapid rotation of the preheater to cause the batch to cascade through the air space. Such an approach is disadvantageous due to exacerbation of the entrainment problem by the cascading of the batch. Otherwise, a much greater vertical separation between the vessels in the patent would be required, which would undesirably lengthen the exhaust flue. In U.S. Pat. No. 3,508,742 (Minegishi) a lack of vertical separation between the preheater and melter is accommodated by a vibrating ramp and burners that propel batch across the gap. Such an arrangement appears to be difficult to control and susceptible to deterioration in the harsh environment. U.S. Pat. No. 4,113,459 (Mattmuller) shows a vertically oriented preheater which requires a potentially troublesome, moving, mechanical feeder to transfer batch material to the melter. A long, horizontally extending feed chute is shown between the preheater and melter in U.S. Pat. No. 4,185,984, an arrangement that would appear to be subject to plugging and may entail a heat loss problem.

SUMMARY OF THE INVENTION

In the present invention, an arrangement is provided for conveying preheated batch material from the discharge end of a preheating vessel such as a rotary kiln to the interior of a liquefying vessel wherein the batch conveyance is isolated from the exhaust gas stream and provides freedom to feed the batch to virtually any selected region of the liquefier. At the same time, the distance between the liquefier and the preheater is not unduly enlarged, and thus the length of the exhaust duct is minimized. Preheated batch discharged from the preheater, rather than received by a chute leading directly to the liquefier, is received by conveying means that can elevate and/or translate the material as needed for proper discharge into the liquefier. In a preferred embodiment, the conveyor means includes bucket means integral with an end of a rotary kiln type preheater. As a result, the feed location into the liquefier may be selected independently of the location from the preheater. The feed location into the liquefier may be offset from the region of intersection of the preheater with the liquefier. For example, with the preferred cylindrical configuration for the liquefier, the feed location may be rotationally displaced about ninety degrees from the intersection with the preheater. Not only is freedom provided for the point of entry into the liquefier but also the angle at which the preheated batch is discharged within the liquefier can advantageously be selected. When, as in the preferred embodiment, the liquefier entails an interior layer of batch material that is being rotated, it is advantageous for the batch material to be fed onto the rotating layer with a tangential component of velocity so as to minimize entrainment of particulate material in the gas streams within the liquefier. Therefore the preferred embodiment of the present invention includes such a tangential orientation.

THE DRAWINGS

DETAILED DESCRIPTION

Although the invention is described herein in connection with a glassmaking operation, it should be apparent that the vitreous condition of the final product need not have an effect on the aspects of the process to which the present invention relates. Therefore, the present invention is not limited to processing glass batch, but encompasses processing any pulverulent material by preheating and liquefying. The product could be vitreous, partially vitreous, ceramic, or even metallic.

Figure 1:
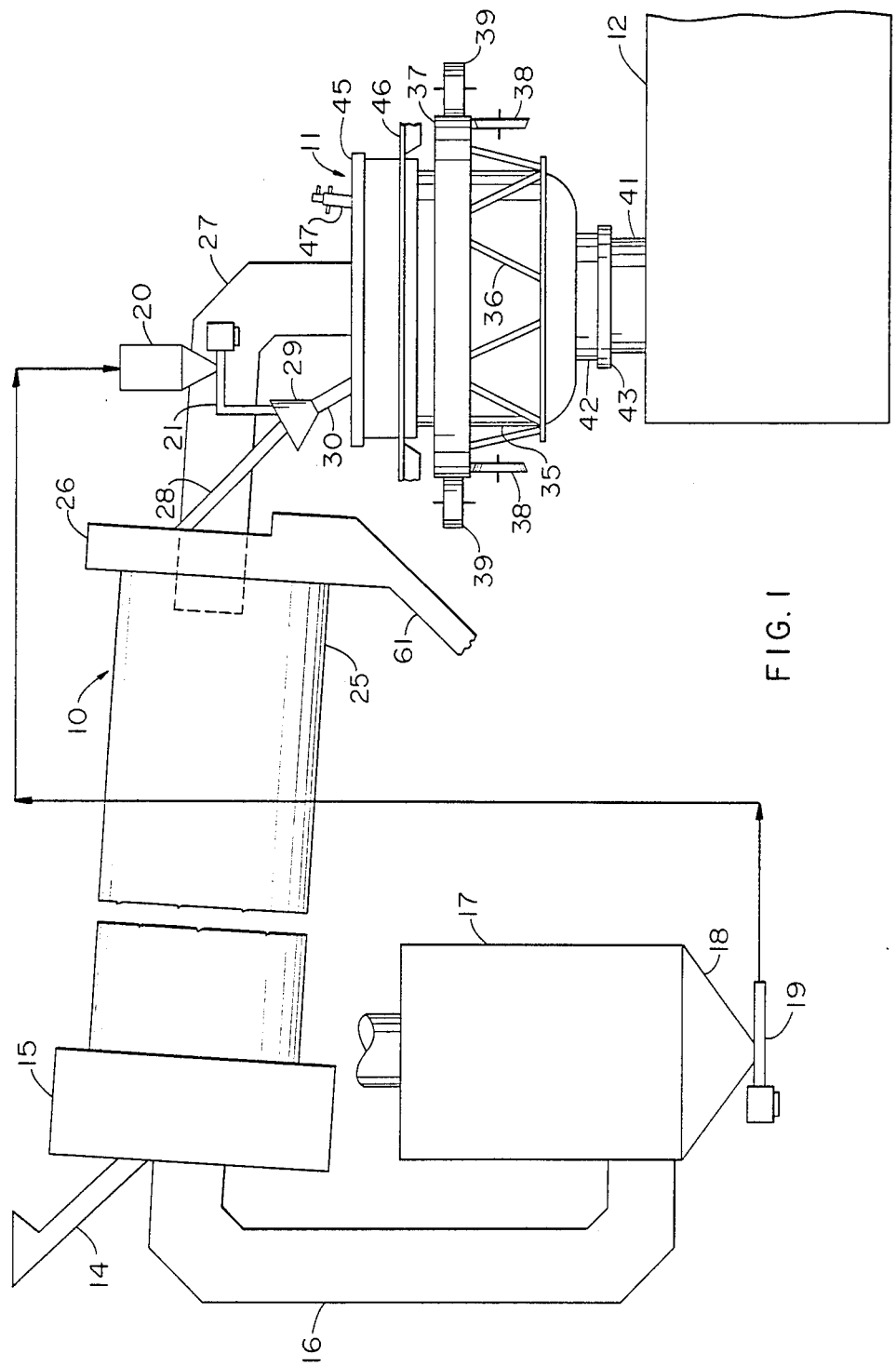
FIG. 1 is a side elevational view of a rotary kiln preheater and a rotary liquefying vessel interconnected with a preferred embodiment of the batch feeding arrangement of the present invention.

In FIG. 1 there is shown the overall arrangement of a rotary kiln 10 feeding batch material to and receiving exhaust gas from a liquefier vessel 11. A vessel 12 may be provided below the liquefier 11 to receive liquefied material for further processing if desired. Reference may be had to U.S. Pat. No. 4,519,814 (Demarest) for details of the construction and operation of the rotary kiln type of preheater and the liquefier vessel that are included in the preferred embodiment here. It should be understood that the particular constructions of the preheater and the liquefier are not critical to the present invention.

Raw materials such as pulverulent glass batch material are fed to the inlet end of the rotary kiln 10 through a delivery chute 14. The inlet end of the rotary kiln is enclosed by a stationary exhaust box 15 that directs exhaust gases leaving the rotary kiln to a duct 16 leading to a particulate separator 17. The use of a particulate separator is optional, depending upon the amount of entrained particles in the exhaust gas stream, and various types of particulate separators may be used. A preferred type is a bag separator in which the exhaust gas is passed through a plurality of heat resistant fabric bags that filter particles from the gas as is well known in the art. In this conventional separator apparatus, the bags are periodically agitated so that the accumulated particles may fall into a hopper portion 18 of the separator apparatus. The collected particulates may be disposed of in any suitable manner but it is preferred that the particulate materials be recirculated to the melting process. Thus in the embodiment shown in FIG. 1, the hopper 18 leads to a screw feeder 19 that conveys the material to a conveyor (shown schematically) such as a pneumatic conveying system. A novel, advantageous feature shown in connection with the preferred embodiment, that is the invention of another not the present inventor, is that the recycled particulates are fed directly to the liquefier 11 thus bypassing the preheating stage. In this connection, a bin 20 may be provided to receive the particulate material from the conveying system from which the material may be fed by a screw feeder 21 to the main batch feeding means for the liquefier.

With continued reference to FIG. 1, the preheater 10 may be configured as a conventional rotary kiln with an outer, cylindrical shell of steel 25, an insulating lining, and optionally an inner steel cylinder (not shown). The rotary kiln is mounted for rotation about its cylindrical axis at an angle slightly inclined from horizontal so as to convey the pulverulent material being heated from the inlet end toward the liquefier 11. The outlet end of the rotary kiln is enclosed by a stationary housing 26, and in this embodiment the transfer arrangement of the present invention is contained within the housing 26 which will be described in greater detail hereinafter. An exhaust duct 27 extends from the liquefier 11 into the rotary kiln 10 and conveys the products of combustion from the fuel burning heat sources in the liquefier into the preheater where heat from the waste gases is transferred to the batch material. A tube 28 carries the heated batch material from the preheater to the liquefier. The tube 28 is of sufficient length to accommodate the spacing of the preheater 10 away from the area above the liquefier 11 for the sake of accessibility, and the tube 28 is of sufficient slope to permit free flow of the batch material by gravity (preferably at least about 45°). The tube 28 may lead to a funnel 29 at which supplemental materials such as the recycled particulates may be added to the batch feed stream. The funnel 29, in turn, leads to an adjustable feed tube 30 extending into the liquefier 11, the details of which will be described herein in connection with FIGS. 4, 5, and 6.

The preferred liquefier embodiment is of the type disclosed in U.S. Pat. No. 4,381,934 (Kunkle et al), the disclosure of which is hereby incorporated by reference. The preferred embodiment is that in which a lining of batch material is maintained on the sidewalls and bottom portion of a steel drum 35 that is rotated about a substantially vertical axis. In the embodiment depicted, the drum 35 is supported by a plurality of rods 36 that are hung from a circular frame 37 mounted for rotation on a plurality of support rollers 38 and aligning rollers 39. A central opening in the bottom of a drum 35 permits liquefied material to flow freely from the liquefier into the receiving vessel 12. A stationary refractory collar 41 may be provided to enclose the falling stream. Also it is preferred that a seal be provided between the rotating portion of the liquefier and the stationary surrounding structures, such as by a rotating flange 42 affixed to the bottom of drum 35 extending into a water-containing, annular, stationary trough 43. The open upper end of drum 35 is covered by a stationary lid assembly 45, which may be constructed of ceramic refractory material or of water-cooled metal, and is supported on peripheral stationary frame members 46. The lid 45 may be provided with openings for insertion of one or more burners 47 for heating the interior of the liquefier. Preferably, a plurality of burners spaced around the periphery of the liquefier are employed. Batch material is deposited onto the lining within the liquefier, leaving a central cavity in which combustion from the burners takes place.

Figure 2:
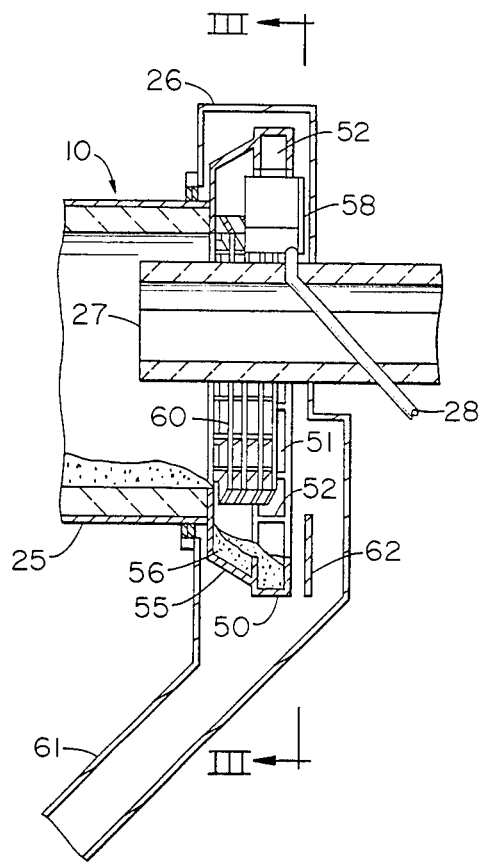
FIG. 2 is a vertical cross-section of the batch discharge end of the rotary kiln depicted in FIG. 1 showing batch elevator means in accordance with a preferred embodiment of the present invention.
Figure 3:
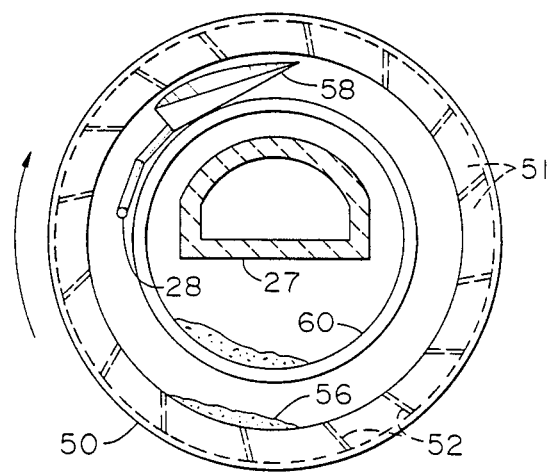
FIG. 3 is a vertical cross-section of the batch discharge end of the rotary kiln taken along line 3—3 in FIG. 2.

A preferred arrangement of the batch transfer mechanism of the Present invention may be seen in the cross-sectional view of the outlet end of the feeder shown in FIG. 2 and in the end view shown in FIG. 3. The basic feature of the batch transfer mechanism shown in FIG. 2 is a bucket elevator type arrangement affixed to the outlet end of the rotary kiln 10, whereby batch material is elevated to a sufficient height to flow by gravity down the tube 28 into which it is discharged. The tube 28 can be of any length dictated by the location in the liquefier to which the batch is to fed, as well as to accommodate the spacing between the preheater and the liquefier. The distance to which the batch travels through the tube 28 and the height to which the batch is elevated by the bucket elevator system are interrelated and are limited by the angle at which the material will flow freely by gravity. Although not preferred, additional length of travel could be achieved by means of auxiliary mechanical devices such as a screw feeder to convey the batch material horizontally during a portion of its travel from the preheater to the liquefier. The bucket elevator shown in FIGS. 2 and 3 is formed by a circular channel 50 opening radially inward toward the center line of the rotary kiln and compartmented into a plurality of bucket chambers 51 by means of a plurality of divider plates 52. The channel 50 is carried by a continuous flange 55 that spaces the channel axially and radially from the lip of the rotary kiln. The buckets are spaced radially outward from the lip of the rotary kiln so that the batch material exiting the rotary kiln falls freely into the buckets. The axial spacing of the buckets from the end of the rotary kiln is an optional feature intended to create a ledge onto which the batch material falling from the rotary kiln first falls before entering the buckets. The purpose of this feature is to reduce abrasive wear of the buckets by the impact of the pulverulent batch materials. The ledge area is designed to hold a portion of batch material 56 which, due to the lack of partitions in the ledge area, rides constantly in the bottom of the flange area. Thus, batch falling out of the rotary kiln lands on this retained portion of batch 56 rather than on the metal surfaces of the bucket elevator mechanism. In the embodiment depicted in FIG. 3, the bucket partitions 52 are angled so as to prevent discharge of the material until the material is carried to the upper portion of the apparatus. There, the material flows freely from the buckets into a receiving pan 58. To avoid interference with other elements of the apparatus, the bottom surface of the receiving pan 58 is shaped as a conical segment. The lower corner of the receiving pan 58 is provided with an opening to permit the material to flow into the tube 28.

An advantageous but optional feature shown in FIGS. 2 and 3 is a grate 60 at the discharge end of the rotary kiln 10. This grate is aligned with the inner surface of the rotary surface so that material passing from the rotary kiln to the buckets 51 must pass through the grate. Thus the grate serves to separate any unduly large agglomerations of material that may have formed within the rotary kiln. Any very large agglomerations that do not pass through the grate 60 will bypass the bucket elevator by being passed directly from the grate to a bypass discharge chute 61. A baffle plate 62 (FIG. 2) may be provided to assist in isolating the bypass chute pathway from the bucket elevator. Any surges of material from the rotary kiln that overflow the bucket elevator will also pass to the discharge chute 61.

Figure 5:
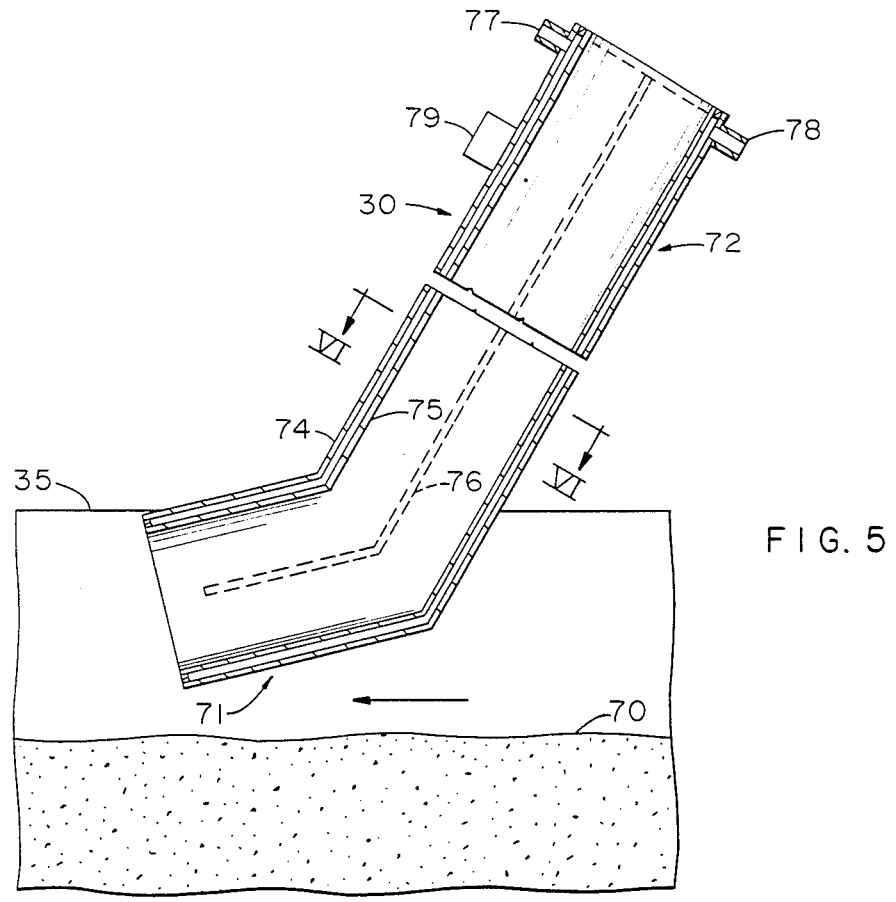
FIG. 5 is an enlarged vertical cross-sectional view of the feed tube of FIG. 4.
Figure 4:
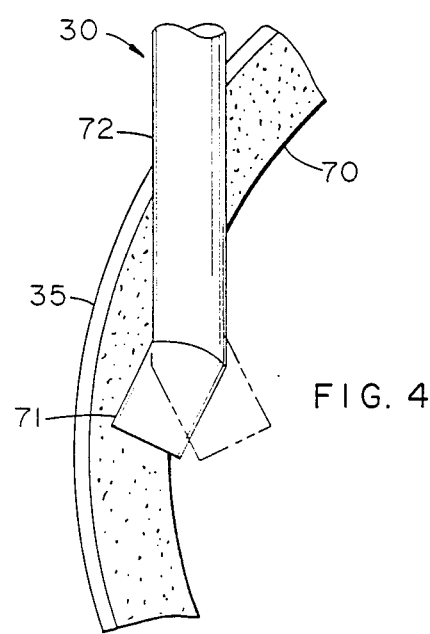
FIG. 4 is a plan view of a portion of the liquefier vessel with the lid removed showing a preferred embodiment of an adjustable feed tube.
Figure 6:
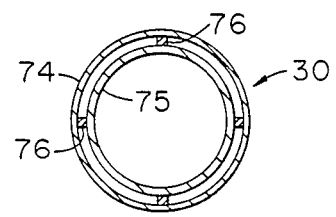
FIG. 6 is a transverse cross-sectional view of the feed tube of FIG. 5 taken along line 6—6.

FIGS. 4, 5, and 6 deal with the details of the feed tube 30 which are being disclosed herein to provide a complete disclosure of the preferred embodiment. This feed tube arrangement, however, is not part of the present invention but is a novel arrangement invented by another. It should be understood that other arrangements could be employed in connection with the present invention for delivering the batch material into the liquefying vessel 11. These alternative arrangements could include a simple, straight tube or a chute with a baffle such as that shown in U.S. Pat. No. 4,529,428 (Groetzinger). Referring to FIG. 4, looking down on an interior portion of the liquefier vessel, the drum 35 has a layer of pulverulent material 70 retained on the interior side thereof. This insulating layer 70 may fluctuate in thickness during operation and in order to deposit the incoming batch material onto the appropriate portion of the layer 70 adjustability of the orientation of the feed tube outlet is provided. In the embodiment shown, this adjustability is achieved by providing the feed tube 30 with an angled end portion 71. When the main portion 72 of the feed tube is rotated about its longitudinal axis, the angled tip portion 71 moves through an arc so the opening at the end of the feed tube can be aligned above different portions of the layer 70. Thus, a simple rotation of the feed tube portion outside the liquefier can alter the location at which the batch is discharged within the liquefier. It is generally desired to feed the batch material onto the uppermost portion of the vertical face of the lining 70. Feeding material too far toward the center beyond the batch layer can lead to undue entrainment of the batch material in the gas streams within the liquefier, and feeding the batch material onto the horizontal end surface of the lining 70 can lead to undue accumulation of batch along the upper rim of the drum 35.

As can be seen in FIG. 5, the angle on the angled tip portion 71 is provided with more of a horizontal component than the main feed tube portion 72 and the tip portion 71 is aimed in a direction substantially tangential to the movement of the adjacent portion of the layer 70 and drum 35. This orientation provides the batch material being discharged from the feed chute with momentum more consistent with that of the material within the rotating liquefier drum, thereby minimizing any scattering and dusting of the material when it lands on the moving layer 70.

Constructional details of the feed tube 30 may be seen in FIGS. 5 and 6. In order to withstand the high temperatures within the liquefying vessel, the tube is preferably provided with cooling means. The cooling arrangement of the embodiment shown in the drawings is provided with annular coolant passageways between an outer cylinder 74 and an inner cylinder 75. Partitions 76 may be provided within the annulus to establish multiple passes for the coolant. Fluid connections 77 and 78 may be provided for respectively supplying and draining the coolant, which is preferably water. As shown in FIG. 5, a radially extending tab 79 may be provided on the portion of the feed tube 30 outside the liquefier for purposes of attaching actuator means for rotating the tube by remote control.

Other variations and modification as would be known to those of skill in the art may be resorted to without departing from the scope of the invention as defined by the claims that follow.

We claim:

1. Apparatus for heating pulverulent material comprising a preheating vessel liquefying vessel adjacent to each other, the preheating vessel including an outlet adapted to discharge pulverulent material from the preheating vessel, conveying means adapted to receive material discharged from the outlet and to transport the material out of a gravity flow path from the outlet, and chute means adapted to receive material from the conveying means and to guide the material into the liquefying vessel.

2. The apparatus of claim 1 wherein the conveying means comprises means for elevating the material to the chute means.

3. The apparatus of claim 2 wherein the means for elevating comprise a plurality of elevator buckets carried on an end portion of the rotary kiln.

4. The apparatus of claim 1 wherein no portion of the preheating vessel overlies any portion of the liquefying vessel.

5. The apparatus of claim 1 wherein the chute means extends to a portion of the liquefying vessel spaced from the portion closest to the preheating vessel.

6. The apparatus of claim 1 further including an exhaust duct connecting the liquefying vessel to the outlet end of the preheating vessel.

7. The apparatus of claim 1 wherein the preheating vessel comprises a rotary kiln.

8. The apparatus of claim 7 wherein the elevator buckets are spaced from the end of the rotary kiln by a continuous flange adapted to hold a residual mass of batch material.

9. Apparatus for heating pulverulent material comprising a rotary kiln adapted to receive pulverulent material at an inlet end and to pass the material in a downstream direction to be discharged at an outlet end, a gas duct terminating within the outlet end of the rotary kiln, means for elevating the pulverulent material at the outlet end downstream from the terminus of the gas duct, and means for receiving the elevated pulverulent material and directing the flow of the material away from the rotary kiln by gravity.

10. Apparatus for heating pulveruluent material comprising a rotary kiln having a generally cylindrical body rotatably supported with its axis inclined downwardly toward an open outlet end, a plurality of elevator buckets substantially encircling the outlet end at a radius greater than that of the adjacent rotary kiln interior and carried on the rotary kiln so as to receive material being discharged from the rotary kiln, and chute means adapted to receive material from the elevator buckets and to guide the material to a second heating vessel.

11. A method of heating thermally fusible material wherein pulverulent batch material is preheated in a first vessel and liquefied in a second vessel, wherein the material is transferred from the first vessel, conveyed out of a gravity flow path, and then discharged by gravity into the second vessel.

12. The method of claim 11 wherein the material is glass batch material.

13. The method of claim 11 wherein the liquefying vessel is rotated about a substantially vertical axis.

* * * * *

UNITED STATES PATENT AND TRADEMARK OFFICE
CERTIFICATE OF CORRECTION

PATENT NO. : 4,726,830

DATED : February 23, 1988

INVENTOR(S) : Gary N. Hughes and Donald P. Michelotti

It is certified that error appears in the above-identified patent and that said Letters Patent is hereby corrected as shown below:

Claim 1 (column 6, line 45), "and a" is missing before "liquefying".

Signed and Sealed this

Twenty-fifth Day of October, 1988

Attest:

DONALD J. QUIGG

*Attesting Officer*      *Commissioner of Patents and Trademarks*